J. A. CAULDWELL.
CHAIN-PUMP BUCKET.

No. 176,460. Patented April 25, 1876.

Witnesses:
E. E. Masson.
A. Cauldwell.

Inventor:
James A. Cauldwell.

UNITED STATES PATENT OFFICE.

JAMES A. CAULDWELL, OF UNION, NEW YORK.

IMPROVEMENT IN CHAIN-PUMP BUCKETS.

Specification forming part of Letters Patent No. 176,460, dated April 25, 1876; application filed March 7, 1876.

*To all whom it may concern:*

Be it known that I, JAMES A. CAULDWELL, of the city of Union, county of Broome, in the State of New York, have invented certain new and useful Improvements in Chain-Pump Buckets; and I do hereby declare that the following specification, taken in connection with the drawings furnished and forming a part of the same, is a clear, true, and complete description thereof.

My invention relates to that class of pumps which consists of an endless chain of buckets, working in a tube and made to fit closely therein, whereby, when the buckets ascend, the water is lifted and a continuous supply obtained.

My invention consists of a bucket-holder with a threaded periphery, a link at one end with projecting shoulders, and a link and brace at the other end, in combination with a nut, provided with a suitable opening and teeth on its upper surface to engage with the shoulders on the link, whereby the bucket is held in proper position and the nut securely locked; and my invention further consists in the formation and construction of the rubber bucket.

To more particularly describe my invention, I will refer to the accompanying drawings, in which—

Figure 1:
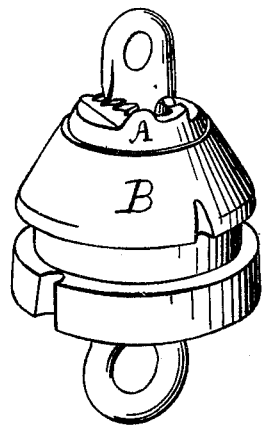
Figure 2:
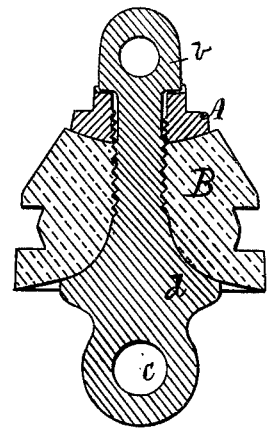
Figure 3:
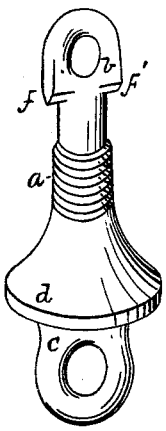
Figure 4:
Figure 5:
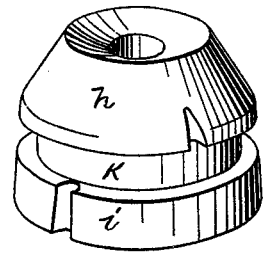

Figure 1 represents my improved bucket and holder in perspective. Fig. 2 represents the same in vertical central section. Fig. 3 represents the holder detached. Fig. 4 represents the nut in top view. Fig. 5 represents the rubber bucket.

The bucket-holder is made of any suitable metal, and consists of the screw $a$, link $b$, provided with projecting shoulders $ff'$, link $c$, and plate $d$, all cast in one piece. A represents the nut with a double eye-opening, $e$, for admitting the link $b$. The upper surface is provided with teeth $g$ for engaging with the projections $ff'$. B represents my improved rubber bucket, of the peculiar shape shown in Fig. 5, consisting of the conical portion $h$, flange $i$, with depression $k$ between them. The elastic rubber bucket is forced over the link $b$ upon the screw $a$ until it comes in contact with plate $d$, when the nut A is placed upon it and turned until the projections $ff'$ engage with the teeth $g$, thereby not only firmly fastening and expanding the bucket, but also securely locking the nut and preventing it from falling over the link $b$. The plates A and $d$ are convex on both surfaces, and the bucket B is made concave on both ends, so that, by compressing the plates, the rubber bucket is easily expanded.

My improved nut has a great advantage in this respect, that it serves a double purpose. After the rubber bucket is first put on, the nut expands it to the desired size and firmly holds it in place, and if after long usage the edges of the rubber wear out, the nut may be turned on the screw $a$ by means of a wrench or other suitable instrument, and the bucket further expanded. My nut may also be used with a bucket of smaller size.

My improved rubber bucket, made in the form described, is very strong and durable, and is provided with the depression $k$ on its surface, to lessen the friction and enable the bucket to work more easily in the tube. When the sides of the bucket become slightly worn, instead of expanding it by turning the nut on the screw, I prefer to place a tubular elastic ring in the space or depression $k$, large enough to press firmly against the interior surface of the tube, and when worn out this can be replaced by another. V-shaped openings are cut in the sides of the bucket to allow the water to drip back into the well when the pump is at rest.

I do not confine myself to the use of my improved nut in combination with this precise form of bucket-holder and bucket, for I am aware that both may be varied in form and yet perform the same function of locking the nut. I am also aware that it is not new to clamp the rubber bucket between two convex plates, to one of which plates is cast a link and depending screw, and to the other plate a link. In this case the plate and link are not only cast in one piece, but are made entirely separate from the bucket-holder, and the rubber bucket is fastened and expanded by screwing up the lower plate with its link on the depending screw; but there is always a risk of its becoming unscrewed from constant use, and if such does happen the chain is broken in two parts, and great damage is done. In my improved bucket-holder the two links and screw-holder are cast in one piece, and no such accident can possibly occur; and if, perchance, the locking-nut, which is not cast with the link, as in the case before referred to, should get loose and fall over the link, no special inconvenience would result.

Having thus described my invention, what I claim as new, and desire to secure by these Letters Patent, is—

1. In combination with a bucket holder and bucket of any desired form, a nut, provided with teeth on its upper surface, substantially as described, and for the purposes specified.

2. In combination with the nut A and rubber bucket B, a bucket-holder, having the link $b$, with its shoulders $f\,f$, screw $a$, link $c$, and convex plate $d$, all cast in one piece, and the whole arranged together, substantially as herein described, and for the purposes specified.

3. A rubber bucket, consisting of the conical surface $h$, depression $k$, and flange $i$, as described, and for the purposes specified.

4. In combination with a rubber bucket of any suitable shape, a holder, having its link $b$, screw $a$, link $c$, and convex plate $d$, all cast in one piece, substantially as described, and for the purpose specified.

JAMES A. CAULDWELL.

Witnesses:
S. W. ADAMS,
F. B. SMITH.